Sept. 29, 1925.
S. H. McKNIGHT
1,555,682
WAVE MOTOR
Filed Jan. 18, 1924
3 Sheets-Sheet 1
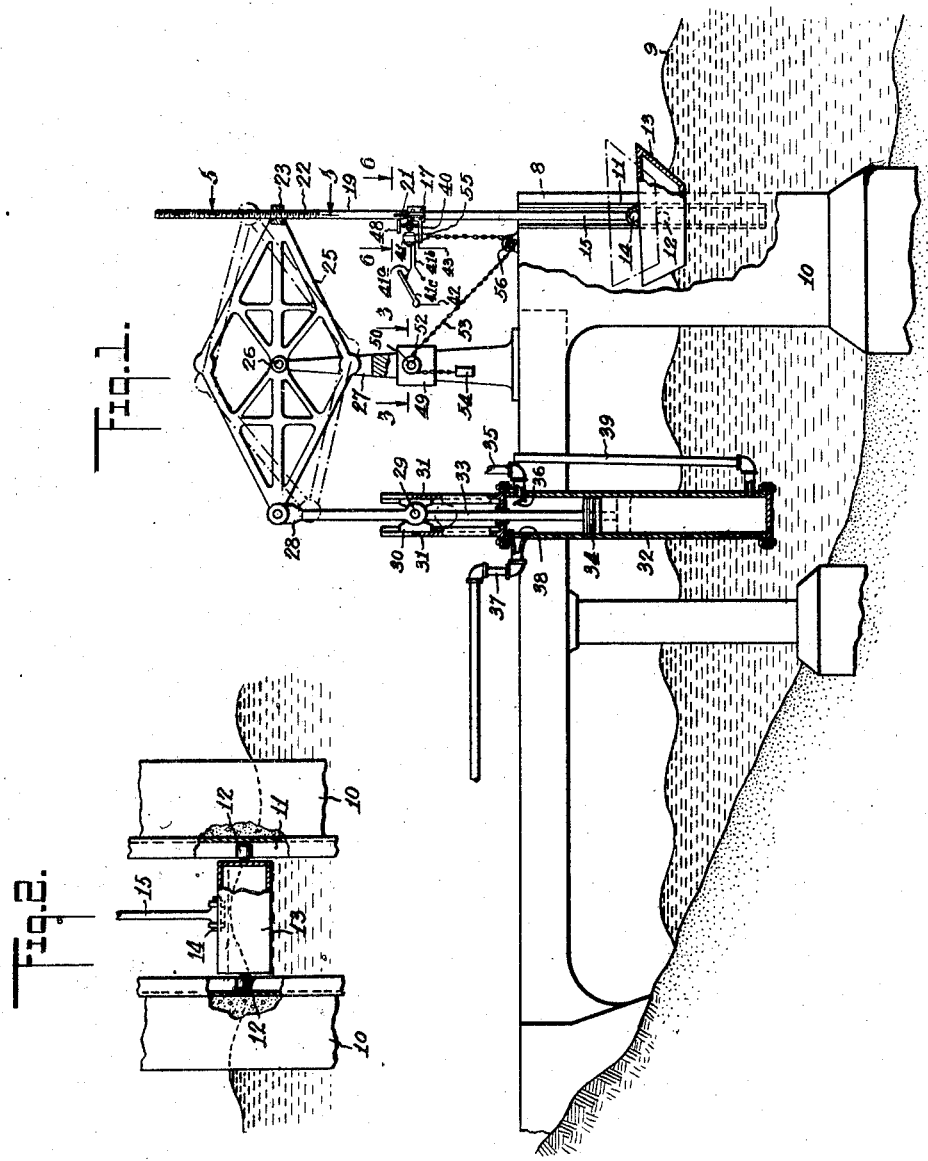

Sept. 29, 1925.

S. H. McKNIGHT

WAVE MOTOR

Filed Jan. 18, 1924     3 Sheets-Sheet 2

WITNESSES

INVENTOR

SAMUEL H. McKNIGHT,
BY

ATTORNEYS

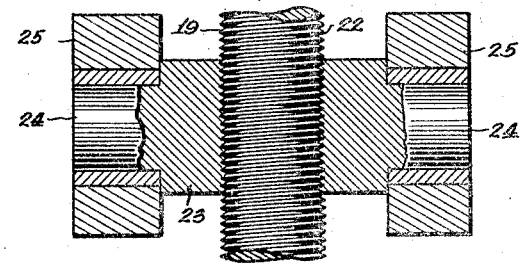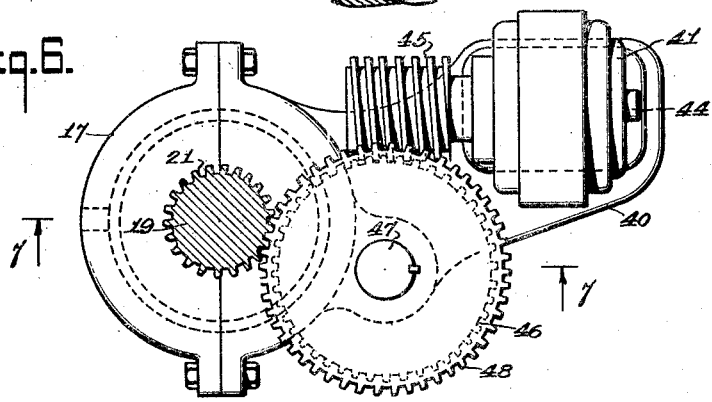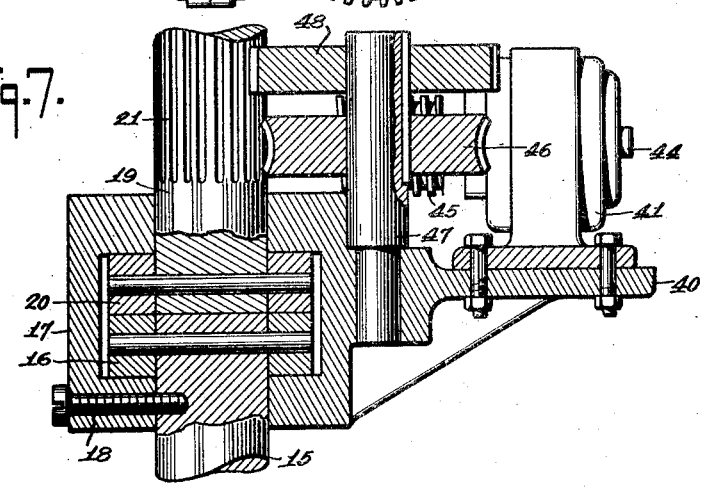

Patented Sept. 29, 1925.

1,555,682

UNITED STATES PATENT OFFICE.

SAMUEL H. McKNIGHT, OF JERSEY CITY, NEW JERSEY.

WAVE MOTOR.

Application filed January 18, 1924. Serial No. 687,067.

*To all whom it may concern:*

Be it known that I, SAMUEL H. MC-KNIGHT, a citizen of the United States, and a resident of Jersey City, in the county of Hudson and State of New Jersey, have invented a new and Improved Wave Motor, of which the following is a full, clear, and exact description.

My invention relates to wave motors, and one of the main objects is to provide means for converting the movement of successive waves into power by taking advantage of the vertical variations of the surfaces of the waves from crest to trough rather than by the horizontal impact of the waves against the wave actuated element as in devices of this class now known to me.

A further object is to provide means, in connection with such motors, whereby the wave actuated element will accommodate itself to the rise and fall of tides in order to maintain the device at the highest possible degree of efficiency at all times, irrespective of the water level.

A further object is to provide a pump, in operative connection with said wave actuated element, which will force water under pressure to any desired point, for any use, such as driving a turbine in operative connection with an electrical generator.

A further object is to provide means for utilizing the weight of the wave actuated element for generating power, said element being intermittently raised by the waves acting thereon and then permitted to fall through gravity when the wave recedes.

Further objects are to provide such devices which are simple in construction, positive and constant in operation, capable of withstanding the elements of nature, require no attention, and which may be made of any desired power limited only by the weight of the wave actuated element.

My invention is fully described in the following specification, of which the accompanying drawings form a part, in which the separate parts are designated by the same reference characters in each of the views, and in which—

Figure 1 is a side elevation of a wave motor constructed in accordance with my present invention, partly in section;

Figure 2 is a fragmentary, front, elevation thereof, partly broken away;

Figure 5 is an enlarged section taken on the line 5—5 of Figure 1;

Figure 6 is an enlarged section taken on the line 6—6 of Figure 1; and

Figure 7 is a section taken on the line 7—7 of Figure 6.

Figure 3:
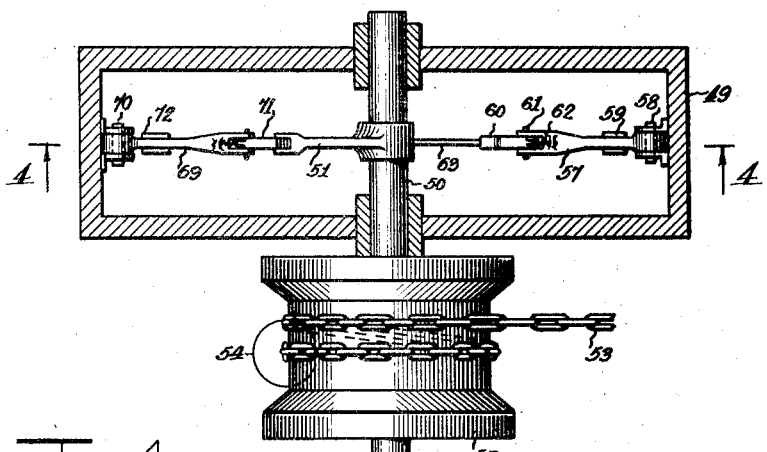
Figure 3 is an enlarged section taken on the line 3—3, of Figure 1.

In the drawings forming a part of this application I have illustrated a present preferred form of embodiment of my invention, comprising a pier 8 extended out over a body of water 9 and supported by columns 10, two as shown, at its outer end, provided with vertical grooves 11 on their inner sides, Figure 2, and in which operate rollers 12 carried by a float 13 which is adapted to rise and fall with the action of waves and with the tides, said float having its seaward side sharply inclined, downwardly and inwardly, in order to permit the waves to slide thereunder and thus raise the float.

Pivoted at 14 to the float is a vertical rod 15 which is flanged at its upper end, Figure 7, at 16 and locked in a casing 17 by means of a set screw 18, a supplemental rod 19 extending upwardly from said casing, in the axis of the rod 15, also provided with a flange 20 thereon, within said casing but not locked thereto, thus permitting the rotation of said rod 19, and this rod 19 is longitudinally grooved at 21 to form pinion teeth, for a reason later explained.

Said rod 19 is screw-threaded, at 22, for a considerable portion of its length, at the top thereof, and engaged with a similar screw-thread in a block 23 pivoted at 24, Figure 5, to one end of a walking-beam 25 carried by trunnions 26 rotatable in a support 27 on the pier 8, and in pivotal connection with the other end of said beam is a link 28 in turn pivoted, at 29, to a slide 30 vertically movable in guides 31 arranged above a pump cylinder 32, a piston rod 33 being also pivoted to said slide and connected with a piston 34 operable in said cylinder.

The cylinder 32 has an inlet pipe 35 controlled by a valve 36, and an outlet pipe 37 controlled by a valve 38, an air pipe 39 being also provided to ensure freedom of piston movement and to expel any water which might enter said cylinder, and it will be seen that the piston 34 moves upwardly and downwardly in the cylinder, through the walking-beam, in the downward and upward movement of the float 13 when acted upon by waves or tides, and water is pumped through the pipe 35, cylinder 32, and pipe 37, whence it may be led to any desired point, not shown.

The casing 17 carries a bracket 40 upon which is mounted an electric motor 41 having two field conductors 41ª and 41ᵇ adapted to be connected with a conductor 42 through the medium of a switch 41ᶜ, a rotor conductor 43 also being provided, said motor being adapted to be reversely actuated by the movement of the switch from one conductor 41ª or 41ᵇ to the other, said switch being manually operated as shown.

The shaft 44 of said motor, Figures 6 and 7, has a worm gear 45 keyed thereto and enmeshed with a worm gear 46 keyed on a stub shaft 47 carried by said bracket and which, in turn, has a spur gear 48 keyed thereto enmeshed with the teeth 21 of the supplemental rod 19, and it will be seen that, if the motor 41 is energized, the supplemental rod 19 is rotated accordingly and moves up or down in the pivoted block 23.

Figure 4:
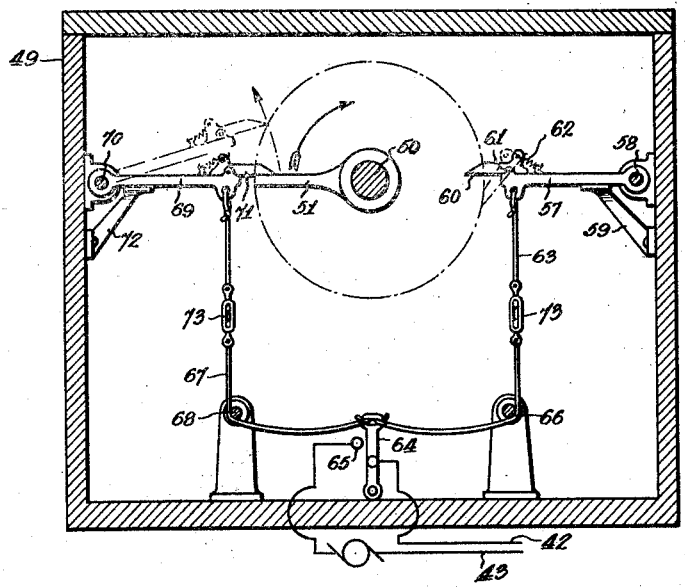
Figure 4 is a section taken on the line 4—4 of Figure 3.

The support 27 of the walking beam carries a case 49 within which is a freely rotatable shaft 50, Figures 3 and 4, which carries an arm 51 within said case, and a pulley or drum 52 on the outside thereof, a chain 53 being wound upon said drum and provided with a weight 54 at its free end, the other end being secured to the bracket 40 at 55, Figure 1; by means of this arrangement the drum 52 and shaft 50 are rotated in either the upward or downward movement of the float 13 and of the bracket 40 connected therewith, the chain being passed through a lead-block 56 on the pier 8, the weight 54 rotating said shaft in one direction, and the upward float movement rotating the same in the other direction.

Within the case 49, on one side of the shaft 50, is an arm 57 pivoted at 58 and capable of upward movement only because of a supporting stop 59, Figure 4, said arm carrying a finger 60 at its outer end and pivoted thereto at 61 and capable of downward movement only but normally held in the position shown by means of a spring 62, said finger being in the path of movement of the shaft arm 51; connected with the arm 57 is one end of a cable 63 and the other end of which is secured to one side of a switch 64 in electrical connection with the conductor 42 and adapted to be placed in connection with the conductor 43 to close a circuit through a suitable source of electrical energy and through the motor 41 to energize the latter in a direction dependent upon the position of the switch 41ᶜ.

The cable 63 is led through a block 66, as clearly shown, and a similar cable 67 is connected with the opposite side of the switch 64 and led through a block 68 and secured to an arm 69 pivoted at 70 and provided with a spring actuated finger 71, in all respects similar to the arm 57, including a rest 72, and, as clearly shown in Fig. 4, a degree of slack is provided in each cable 63 and 67.

In the vertical movement of the float 13, by the wave motion, the walking beam is oscillated and the pump piston reciprocated, the said piston moving downward freely but pumping water in its upward movement, the waves thus lifting the float without resistance other than its weight and, when a wave recedes, the float descends through gravity to raise the piston 34 to pump water, said pumping being accomplished only by the weight of the float, and the waves merely raising the float to bring it back to initial pumping position.

When the float is carried upwardly by a wave, the chain 53 is carried therewith, thus revolving the shaft 50 in the direction of the arrow, Fig. 4, and the arm 51 raises the arm 69, thus pulling the switch over to the contact 65 of the conductor 43, thus closing the circuit through the motor to energize the same, and the supplemental rod 19 is screwed upwardly into the block 23, but the pitch of the screw-thread 22 is so fine as to make this inappreciable in each upward float movement, and the slack in the cable 67 is regulated by means of a turnbuckle 73, as is also the slack in the cable 63, to retard the moment of motor actuation and advance its de-energizing in order to have this upward feed of the rod 19 conform to the rise of the tide, whereby the relationship between the walking-beam and the mean water level is maintained.

When a wave recedes, the float lowers, and the weight 54 rotates the shaft 50 in the opposite direction, thereby causing the arm 51 to strike the finger 60 and raise the arm 57 and thus retract the switch 64 to open the circuit and de-energize the motor, and said shaft is thus alternately rotated in opposite direction by the rise and fall of the float with each wave, and the rod 19 is thus fed slightly upwards, during the incoming of the tide, to compensate for the rise in the mean water level.

When the tide begins to ebb, the switch 41ᶜ is manually thrown over to reverse the direction of the motor 41, and the rod 19 is thus gradually retracted in the block 23 in each upward movement of the float through the action of a wave thereon, keeping pace with the fall of the mean water level, and the pump action through the weight of the float continues during the ebb of the tide and, when the tide again turns, the switch 41ᶜ is again thrown to again reverse the direction of the motor actuation.

It will thus be seen that, aside from the manual switch operation, my device is entirely automatic and adjusts itself to the rise and fall of tides, thereby permitting full efficiency to the float and pump actuation at all times, and the float is never retarded in its upward movement other than by its own weight and the friction of the parts, the latter being overcome, however, by anti-friction bearings, and the motor actuation of the rod 19 occurs always in the rise of the float when the strain on the rod is the lowest.

I may, if desired, provide automatic means for throwing the switch 41ᶜ, but this will form the subject matter of a new application for Letters Patent; I may make the pump cylinder of any desired length in order to accommodate the same to abnormal float action, as in storms, without injury to any of the parts of the device; I may make the float of any desired size, shape, or weight; and I may make other changes in the details shown and described, within the scope of the following claims, without departing from the spirit of my invention or sacrificing its advantages.

Having fully described my invention, what I claim as new, and desire to secure by Letters Patent, is:—

1. The combination of a float mounted for movement in response to the rise and fall of a body of water, and mechanism connected to the float and operable by virtue of the movement of the float to generate power, said mechanism including adjusting means for varying the distance of travel of said float, an electric motor for operating said adjusting means, and automatically operable electrical means for controlling said motor.

2. The combination of a float mounted for vertical movement in response to the rise and fall of a body of water, and mechanism connected to the float and operated by virtue of the movement of the float to generate power, said mechanism including adjusting means for varying the distance of travel of said float, and automatically operable means for controlling said adjusting means.

3. The combination of a float mounted for movement in response to the rise and fall of a body of water and mechanism connected to the float and operable by virtue of the movement of the float to generate power, said mechanism including motor operated means for varying the distance of travel of said float, and weight operated means for controlling said motor driven means.

4. The combination of a float resting upon a body of water, means for guiding the same vertically, means for utilizing the intermittent vertical movement of said float by wave action to generate power, a rotatable rod connected with said float, and means for actuating said rod to accommodate the device to varying tide levels.

5. The combination of a float resting upon a body of water, means for guiding the same vertically in the movement thereof by wave action, means for utilizing said float movement to generate power, a rod in rotatable connection with said float, a walking-beam into which said rod is threaded, means for rotating said rod to compensate for varying tide levels, and power generating means in operative connection with said walking-beam.

6. The combination of a float resting upon a body of water, means for guiding the same vertically in the movement thereof by wave action, a walking beam, a rod connected with said float and threaded into said beam, an electric motor in operative connection with said rod to rotate the same, means for energizing said motor in the gradual upward movement of said float in varying tide levels, and means for utilizing the intermittent float movement by wave action to generate power.

7. The combination of a float resting upon a body of water, means for guiding the same vertically in the action of waves thereon, means for utilizing said float movement to generate power, a walking-beam, a rod connected with said float and threaded into said beam, an electric motor in operative connection with said rod to rotate the same upwardly through said beam, means for energizing said motor in the continued upward movement of said float due to tidal action, and means for deenergizing said motor in the continued downward movement of said float through the tides to permit said rod to reverse its direction of rotation in said beam.

SAMUEL H. McKNIGHT.